United States Patent

Aoki et al.

Patent Number: 5,884,839
Date of Patent: Mar. 23, 1999

[54] HEATING APPARATUS FOR VEHICLE HAVING HEAT-GENERATING UNIT

[75] Inventors: Shinji Aoki, Kariya; Toshio Morikawa, Toyota; Hajime Ito, Kariya; Goro Uchida, Toyota; Yasushi Kato, Toyota; Norifumi Ban, Toyota, all of Japan

[73] Assignee: Denso Corporation, Kariya, Japan

[21] Appl. No.: 862,866

[22] Filed: May 23, 1997

[30] Foreign Application Priority Data

May 24, 1996 [JP] Japan .................. 8-129456
Jul. 18, 1996 [JP] Japan .................. 8-189740

[51] Int. Cl.⁶ .................................. B60H 1/02
[52] U.S. Cl. .................... 237/12.3 R; 126/247; 122/26
[58] Field of Search ............ 237/12.3 B, 12.3 R; 122/26; 126/247

[56] References Cited

U.S. PATENT DOCUMENTS

| | | |
|---|---|---|
| 2,344,075 | 3/1944 | Beldimano . |
| 2,749,049 | 6/1956 | Smith . |
| 3,720,372 | 3/1973 | Jacobs . |
| 4,271,790 | 6/1981 | Ahmed et al. . |
| 4,974,778 | 12/1990 | Bertling . |
| 4,993,377 | 2/1991 | Itakura . |
| 5,573,184 | 11/1996 | Martin . |

FOREIGN PATENT DOCUMENTS

| | | |
|---|---|---|
| A-56-128214 | 10/1981 | Japan . |
| A-2-254010 | 10/1990 | Japan . |
| A-3-57877 | 3/1991 | Japan . |
| A-6-92134 | 4/1994 | Japan . |

*Primary Examiner*—Henry A. Bennett
*Assistant Examiner*—Derek Boles
*Attorney, Agent, or Firm*—Harness, Dickey & Pierce, PLC

[57] ABSTRACT

In a heating apparatus according to the present invention, when a temperature of cooling water in a cooling water circuit is equal to a set cooling water temperature or less, a viscous clutch is turned on to operate a viscous heater disposed in the cooling water circuit, for maintaining the temperature of the cooling water in the cooling water circuit at a predetermined value. A shaft of the viscous heater is rotated by a water-cooled engine through a belt transmitting mechanism and the viscous clutch. The set cooling water temperature is increased in accordance with an increase of a target air temperature calculated based on a set temperature, an inside air temperature, an outside air temperature, and a sunlight amount to optimize a used condition of the viscous heater.

11 Claims, 11 Drawing Sheets

HEATING APPARATUS FOR VEHICLE HAVING HEAT-GENERATING UNIT

CROSS REFERENCE TO THE RELATED APPLICATION

This application is based on and claims priority of Japanese Patent Application Nos. Hei. 8-129456 filed on May 24, 1996, and Hei. 8-189740 filed on Jul. 18, 1996, the contents of which are incorporated herein by reference.

BACKGROUND OF THE INVENTION

1. Field of the Invention

The present invention relates to a heating apparatus for a vehicle, in which a heat-generating unit using a shearing force, for increasing a temperature of cooling water for cooling a water-cooled engine is disposed in a cooling water circuit.

2. Description of Related Art

Conventionally, as a heating apparatus for a vehicle, a hot water type heating apparatus for heating a passenger compartment has been generally known. In the hot water type heating apparatus, cooling water for cooling a water-cooled engine is supplied to a heater core disposed in a duct, and air heated while passing through the heater core is blown into the passenger compartment by a blower to heat the passenger compartment.

However, in a case of a vehicle in which an amount of generating heat of the engine is too small to heat the cooling water with the engine sufficiently, such as a vehicle having a diesel engine or a lean burn engine, because a temperature of the cooling water in the cooling water circuit cannot be maintained at a predetermined temperature (for example, 80° C.), there occurs a problem in that a heating capacity for the passenger compartment is insufficient.

To overcome such a problem, as disclosed in JP-A-2-246823, JP-A-3-57877, and JP-A-2-254010, the following heating apparatus for a vehicle has been conventionally proposed. In the heating apparatus for a vehicle, a heat-generating unit using a shearing force, for heating cooling water supplied to a heater core, is disposed in a cooling water circuit, the heat-generating unit is operated when the cooling water temperature is equal to or lower than a set cooling water temperature to improve the heating capacity for the passenger compartment.

The heat-generating unit transmits a rotational driving force of the engine to a shaft through a belt transmitting mechanism and the electromagnetic clutch. In a case of the unit, there are formed a heat-generating chamber and a cooling water passage at an outer periphery of the heat-generating chamber. A rotor which rotates integrally with the shaft is disposed in the heat-generating chamber, and a shearing force generated by a rotation of the rotor is applied to viscous fluid such as silicon oil sealed in the heat-generating chamber to generate heat. The cooling water is heated by the generated heat.

However, according to the above-described conventional heating apparatus for a vehicle, since the rotational driving force (driving torque) acting on the shaft of the heat-generating unit is converted into an auxiliary heating source, a large load due to the driving torque (driving load) is applied to the engine, thereby causing a problem in that fuel consumption rate of the engine lowers and running cost of the vehicle rises.

To prevent the heat-generating unit from being operated excessively, the set cooling water temperature may be lowered so that deterioration of the fuel consumption rate can be suppressed. However, in this case, because the temperature of the cooling water cannot be maintained at a predetermined temperature, a radiating amount of the heater core disposed in the duct is lowered, thereby causing a problem in that a sufficient heating capacity cannot be obtained.

SUMMARY OF THE INVENTION

In view of the above-described problems, it is accordingly an object of the present invention to provide a heating apparatus for a vehicle, capable of preventing the fuel consumption rate of the engine from being lowered as well as maintaining the temperature of the cooling water in the cooling water circuit at a predetermined temperature to obtain a sufficient heating capacity, by optimizing a used condition of the heat-generating unit.

Further, it is another object to provide a heating apparatus, capable of heating the passenger compartment, which is suitable for a heating feeling of a passenger.

According to the present invention, in a heating apparatus for a vehicle having a water-cooled engine, a heating heat exchanger is disposed in a cooling water circuit to heat a passenger compartment by heat-exchanging cooling water with air, and a heat-generating unit using a shearing force, is disposed in the cooling water circuit to heat the cooling water. The heat-generating unit has a rotor which rotates when a rotational driving force is applied thereto and a heat-generating chamber for sealing therein viscous fluid which generates heat to heat the cooling water to be supplied to the heating heat exchanger when a shearing force generated by a rotational driving force of the rotor is applied to the viscous fluid. The heat-generating unit is operated when a physical amount relative to a temperature of the viscous fluid is equal to a set value or less and is stopped when the physical amount exceeds the set value. Further, the heat-generating unit is operated when a degree requiring a heating operation for the passenger is equal to a predetermined value or more and is stopped when the degree requiring a heating operation for the passenger compartment is lower than the predetermined value.

In this way, when the degree requiring a heating operation for the passenger is high, the heat-generating unit is operated. Therefore, the cooling water heated in the heat-generating unit is supplied to a heating heat exchanger disposed in a duct, and the temperature of the cooling water in the cooling water circuit to be supplied to the heating heat exchanger is increased and is maintained at the predetermined temperature. Accordingly, a radiating amount of the heating heat exchanger is increased so that air sufficiently heated in the heating heat exchanger is blown into the passenger compartment.

On the other hand, when the degree requiring a heating operation for the passenger is low, an operation of the heat-generating unit is stopped. Therefore, because it is not necessary to transmit a rotational driving force to the heat-generating unit through a driving unit, a load of the engine and a load of the driving unit can be reduced. Accordingly, a fuel consumption rate of the engine can be lowered, and a running cost for the vehicle can be reduced. Further, it is possible to prevent a generation of an abnormal noise due to a slipping of the driving unit.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PRESENTLY PREFERRED EMBODIMENTS

Figure 1:
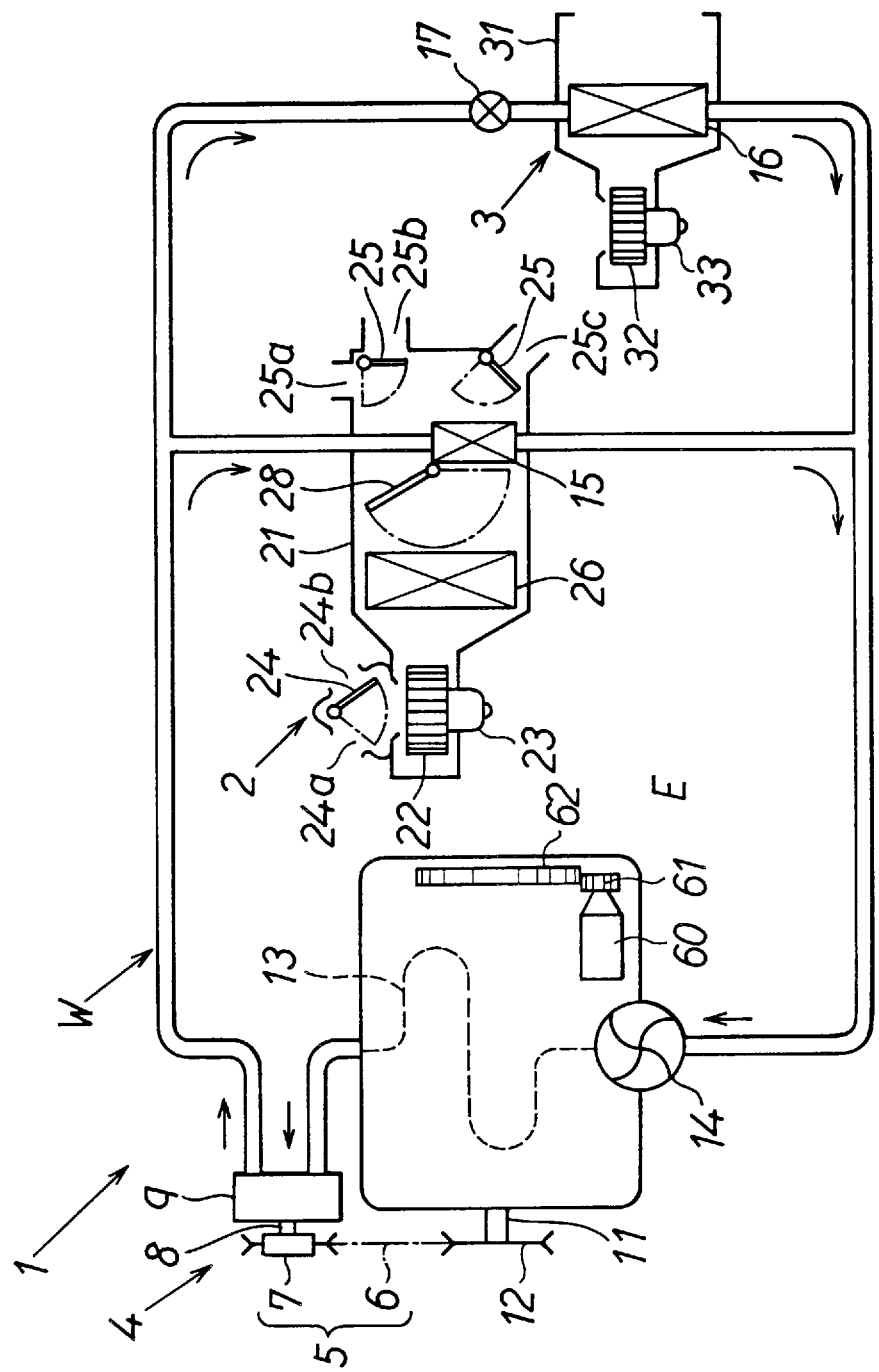
FIG. 1 is a schematic view showing an entire construction of an air-conditioning apparatus for a vehicle according to a first embodiment of the present invention.

Embodiments of the present invention will be described with reference to the drawings.

A first embodiment of the present invention will be described.

An entire system 1 for a vehicle is equipped with a water-cooled diesel engine E (hereinafter referred to as "engine") disposed in a engine compartment of a vehicle, an air-conditioning unit 2 for air-conditioning a passenger compartment, a rear heating unit 3 for heating a rear-side of the passenger compartment, a heat-generating unit using a shearing force 4, for heating cool water for cooling the engine E, an air-conditioning ECU 100 for controlling the air-conditioning unit 2 and the rear heating unit 3, an engine ECU 200 for controlling the engine E, and the like.

The engine E is provided with a cylinder block and a water jacket around a cylinder head. To an output shaft (crankshaft) 11 of the engine E, there is attached a crank pulley 12 connecting to a V-belt 6 (described later). The water jacket 13 is disposed in a cooling water circuit W through which the cooling water circulates.

The engine E is also provided with a starter 60 for starting the engine E. The starter 60 is a D.C. motor to starts the engine by engaging a pinion gear 61 with a ring gear 62 of the engine E when an electric current is supplied thereto.

In the cooling water circuit W, there is disposed a water pump 14 for compulsorily pumping the cooling water, a radiator (not shown) for cooling the cooling water by heat-exchanging the cooling water and air, a front heater core 15 for heating air by heat-exchanging the cooling water and air, a rear heater core 16 for heating air by heat-exchanging the cooling water and air, a water valve for controlling a supply and an interruption of the cooling water into the rear heater core 16, and the like. The water pump 14 is disposed at an upstream side of the water jacket 13 of the engine E and is rotated by the output shaft 11 of the engine E.

The air-conditioning unit 2 is constructed by a front duct 21, a front blower 22, a refrigeration cycle, a front heater core, and the like. At an upwind side of the front duct 21, there is rotatably provided an inside air/outside air switching damper 24 for selectively opening and closing an outside air inlet 24a and an inside air inlet 24b to switch an air inlet mode. At an downwind side of the front duct 21, there is rotatably provided a mode switching damper 25 for selectively opening and closing a defroster air outlet 25a, a defroster air outlet 25b and a foot air outlet 25c to switch an air outlet mode.

The front blower 22 is rotated by a blower motor 23 to generate an air flow toward the passenger compartment in the front duct 21.

The refrigeration cycle is composed of a compressor (auxiliary equipment for the engine, refrigerant compressor), a condenser (refrigerant condenser), a receiver (gas-liquid separator), an expansion valve (decompressing device), an evaporator (refrigerant evaporator), a refrigerant pipe for circularly connecting these components, and the like.

The compressor is equipped with an electromagnetic clutch (hereinafter referred to as "clutch") 27, and compresses refrigerant sucked from the evaporator 26 and discharges the compressed refrigerant toward the condenser. The clutch 27 is connected to a crank pulley 12 (see FIG. 2) attached to the output shaft 11 of the engine E through the V-belt 6. When an electromagnetic coil of the clutch 27 is electrified, an output portion (armature, inner hub) is attracted to an input portion (rotor) so that a rotational power is transmitted to the compressor. The evaporator 26 is disposed in the front duct 21 to cool air flowing therethrough.

The front heater core 15 is disposed within the front duct 21 at a downstream side (upwind side) of the evaporator 26 with reference to the air flow direction and is connected to the cooling water circuit W at a downstream side of the heat-generating unit 4 with reference to the flow direction of the cooling water. The front heater core 15 heats air by heat-exchanging the air having passed through the evaporator 26 and the cooling water.

At an upwind side of the front heater core 15, there is rotatably provided an air-mixing damper 28. The air-mixing damper 28 adjusts a ratio between an amount of air (warm air) passing through the front heater core 15 and an amount of air (cool air) bypassing the front heater core 15 so that a temperature of air blown out into the passenger compartment can be adjusted.

The rear heating unit 3 is constructed by a rear duct 31, a rear blower 32, a rear heater core 16, and the like. At a downwind side of the rear duct 31, there is opened a foot air outlet (not shown).

The rear blower 32 is rotated by a blower motor 33 to generate an air flow toward the passenger compartment within the rear duct 31.

The rear heater core 16 is disposed in the rear duct 31 and is connected to the cooling water circuit W at a downstream side of the heat-generating unit 4 with reference to the flow direction of the cooling water through a water valve 17. The rear heater core 16 heats air by heat-exchanging air passing through the rear duct 31 and the cooling water. Next, the heat-generating unit 4 will be described briefly with reference to FIGS. 1–4. FIG. 3 and show the heat-generating unit 4.

The heat-generating unit 4 is composed of a belt transmitting mechanism 5 connected to and driven by the output shaft 11 of the engine E, and a heat-generating device 9 (hereinafter referred to as "viscous heater") having a shaft 8.

Figure 2:
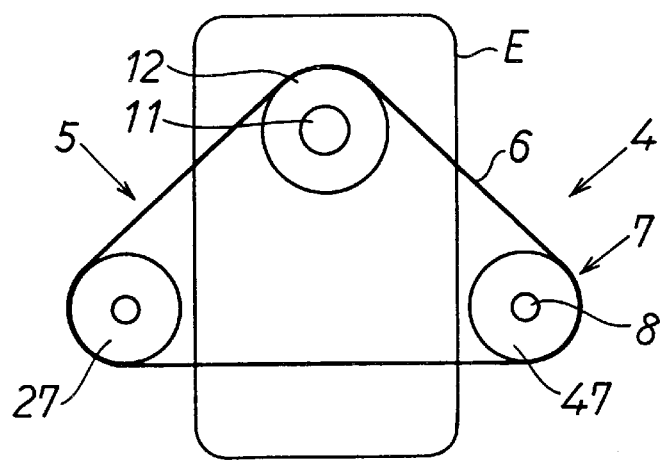
FIG. 2 is a schematic view showing an engine and a belt transmitting mechanism in the first embodiment.
Figure 3:
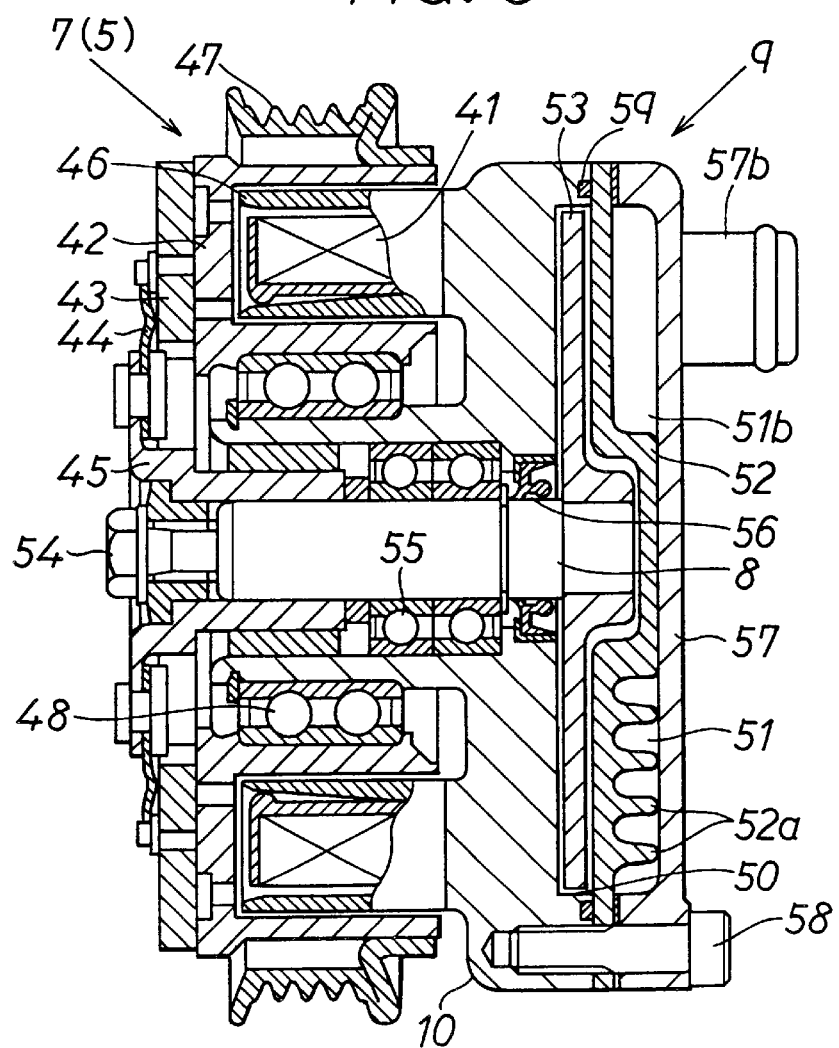
FIG. 3 is a cross sectional view showing a viscous clutch and a viscous heater in the first embodiment.
Figure 4:
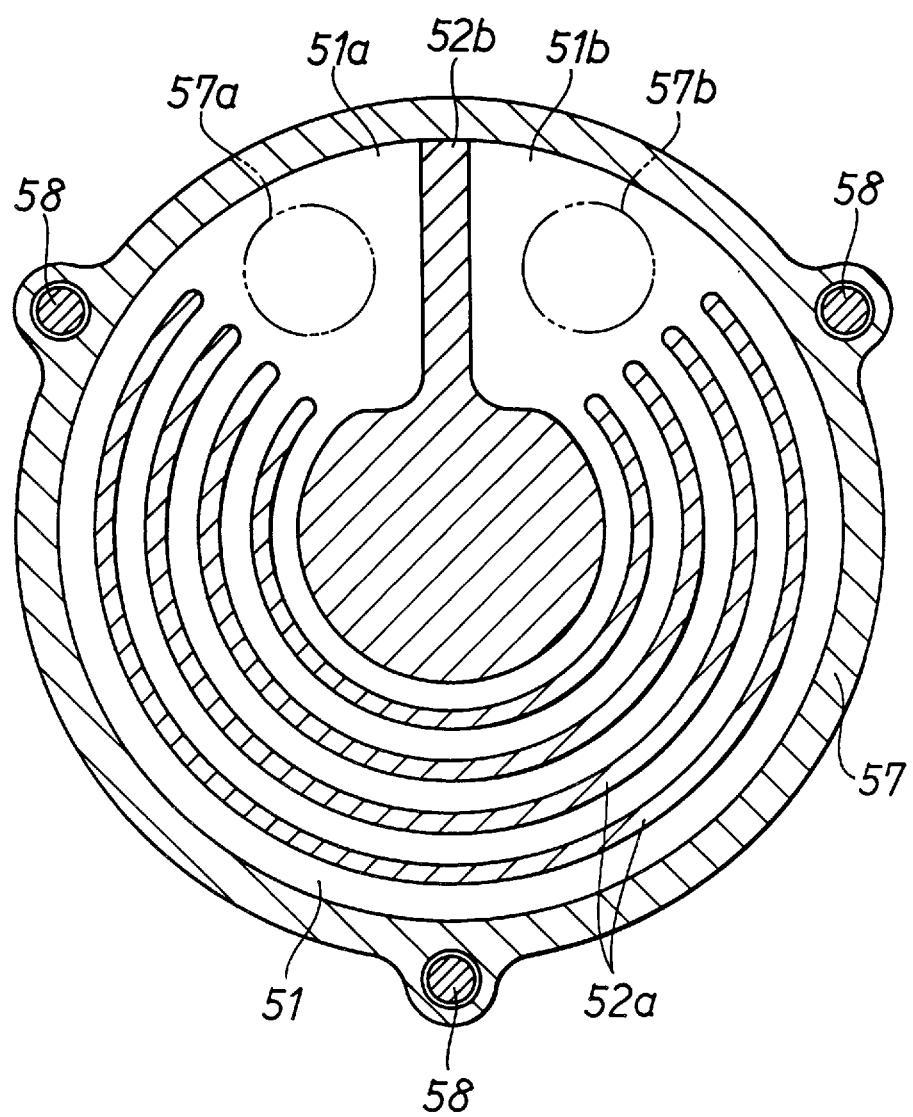
FIG. 4 is a cross sectional view showing the viscous heater in the first embodiment.

The belt transmitting mechanism 5 includes, as shown in FIGS. 1 and 2, a multi-stage type belt hung on the crank pulley attached to the output shaft 11, and an electromagnetic clutch 7 (hereinafter referred to as "viscous clutch") connected to and driven by the output shaft 11 (crank pulley 12).

The V-belt 6 transmits a rotational force (driving force) of the engine E to a shaft 8 of the viscous heater 9 through the viscous clutch 7. In this embodiment, the V-belt 6 is hung on the clutch 27 and the viscous clutch 7.

The viscous clutch 7 is, as shown in FIG. 3, constructed by an electromagnetic coil 41 for generating a magnetomotive force when being electrified, a rotor 42 rotated by the engine E, an armature 43 attracted toward the rotor 42 by the magnetomotive force, an inner hub 45 connected to the armature 43 with a plate spring 44 and supplying a rotational force to the shaft 8 of the viscous heater 9, and the like.

The electromagnetic coil 41 is structured by winding a conductive lead wire covered with an insulating material. The electromagnetic coil 41 is disposed in the stator 46 and is fixedly molded in the stator 46 with an epoxy resin. The stator 46 is fixed on a front surface of the viscous heater 9.

A V-pulley 47 hanging the V-belt 6 on a periphery thereof is joined to the rotor 42 by joining means such as welding and is a rotating body (input portion of the viscous clutch 7) which always rotates by a rotational force of the engine E, transmitted thereto through the V-belt 6. The rotor 42 is formed of magnetic material to have a U-shaped cross section and is rotatably supported on an outer periphery of a housing 10 of the viscous heater 9 with a bearing 48 disposed in an inner periphery thereof.

The armature 43 has a friction surface formed in a ring-shaped plate, which is opposed to a friction surface of the rotor 42, formed in a ring-shaped plate, by an air gap (e.g., a clearance of 0.5 mm) therebetween. The armature 43 is formed of magnetic material. When the armature 43 is attracted to the friction surface of the rotor 42 by the electromotive force of the electromagnetic coil 41, the rotational force of the engine E is transmitted from the rotor 42 to the armature 43.

The plate spring 44 is fixed to the armature 43 at an outer peripheral side by fixing means such as a rivet and is fixed to the inner hub 45 at an inner peripheral side by fixing means such as a rivet. The plate spring 44 is an elastic member for displacing the armature 43 in a direction (the left direction in the drawing) as to be separated (released) from the friction surface of the rotor 42 when the supply of the electric current to the electromagnetic coil 41 is stopped, to return the armature 43 to an initial position thereof.

The inner hub 45 is an output portion of the viscous clutch 7 such that the input side thereof is connected to and driven by the armature 43 through the plate spring 44 and the output side is connected to and driven by the shaft 8 of the viscous heater 9 with a spline fitting connection.

The viscous heater 9 is a supplementary heating source of the engine E which is the main heating source, and is constructed by a shaft rotated by the engine E through the V-belt 6 and the viscous clutch 7, a housing 10 for rotatably supporting the shaft 8, a separator 52 for dividing an inner space of the housing 10 into a heat-generating chamber 50 and a cooling water passage 51, a rotor 53 rotatably disposed in the housing 10, and the like.

The shaft 8 is an input shaft which is fixedly fastened to the inner hub 45 of the viscous clutch 7 by fastening means such as a bolt and rotates integrally with the armature 43. The shaft 8 is rotatably disposed in an inner periphery of the housing 10 with a bearing 55 and a sealing member 56. The sealing member 56 employs an oil-seal for preventing a leakage of the viscous fluid.

The housing 10 is made of a metallic member such as aluminum alloy. A cover 57 formed in a ring-shaped plate is fixedly fastened to a rear end of the housing 10 by fastening means 58 such as a bolt and a nut. On a surface where the housing 10 and the cover 57 are joined, there are disposed the separator 52 and a sealing member 59. The sealing member 59 employs an oil-seal for preventing a leakage of the cooling water.

The separator 52 is a partition member which is made of a metallic member such as aluminum alloy, which is superior in heat conductivity. An outer peripheral portion of the separator 52 is sandwiched between a cylindrical portion and a cylindrical portion of the cover 57. Between a front end surface of a partition wall 52b and a rear end surface of the housing 10, there is formed the heat-generating chamber for sealing viscous fluid (e.g., silicon oil) which generates heat when a shearing force is applied thereto.

Between a rear end surface and the cover 57, there is formed the cooling water passage 51, which are liquid-tightly partitioned from the outside and in which the cooling water for cooling the engine E circulates. Further, on the rear end surface of the separator 52 at a lower side, there are integrally formed a plurality of fin portions 52a having a substantially arcuate shape, for transmitting heat of the viscous fluid to the cooling water efficiently.

Instead of the fin portions 52a, the rear end surface of the separator 52 may be formed in a convex and concave shape, or a heat transmission facilitating member such as a corrugated fin and a fine pin fin may be provided on an outer wall surface of the cover 57. Further, between the separator 52 and the rotor 53, there may be formed a labyrinth seal as the heat-generating chamber 50.

The partition wall 52b for partitioning an upstream side water passage 51a and a downstream side water passage 51b are formed to protrude from the rear end surface of the separator 52. To an outer wall portion of the cover 57, which is adjacent to the partition wall 52b, there are connected an inlet side cooling water pipe 57a into which the cooling water flows and an outlet side cooling water pipe 57b through which the cooling water flows out.

The rotor 53 is rotatably disposed in the heat-generating chamber 50 and is fixed to an outer periphery of the rear end portion of the shaft. On an outer peripheral surface or both side wall surfaces of the rotor 53, there are formed a plurality of groove portions (not shown). Between the adjacent groove portions, there is formed a protrusion portion. When the rotational force of the engine E is supplied to the shaft 8, the rotor 53 rotates integrally with the shaft 8 to generate a shearing force to the viscous fluid sealed in the heat-generating chamber 50.

Figure 5:
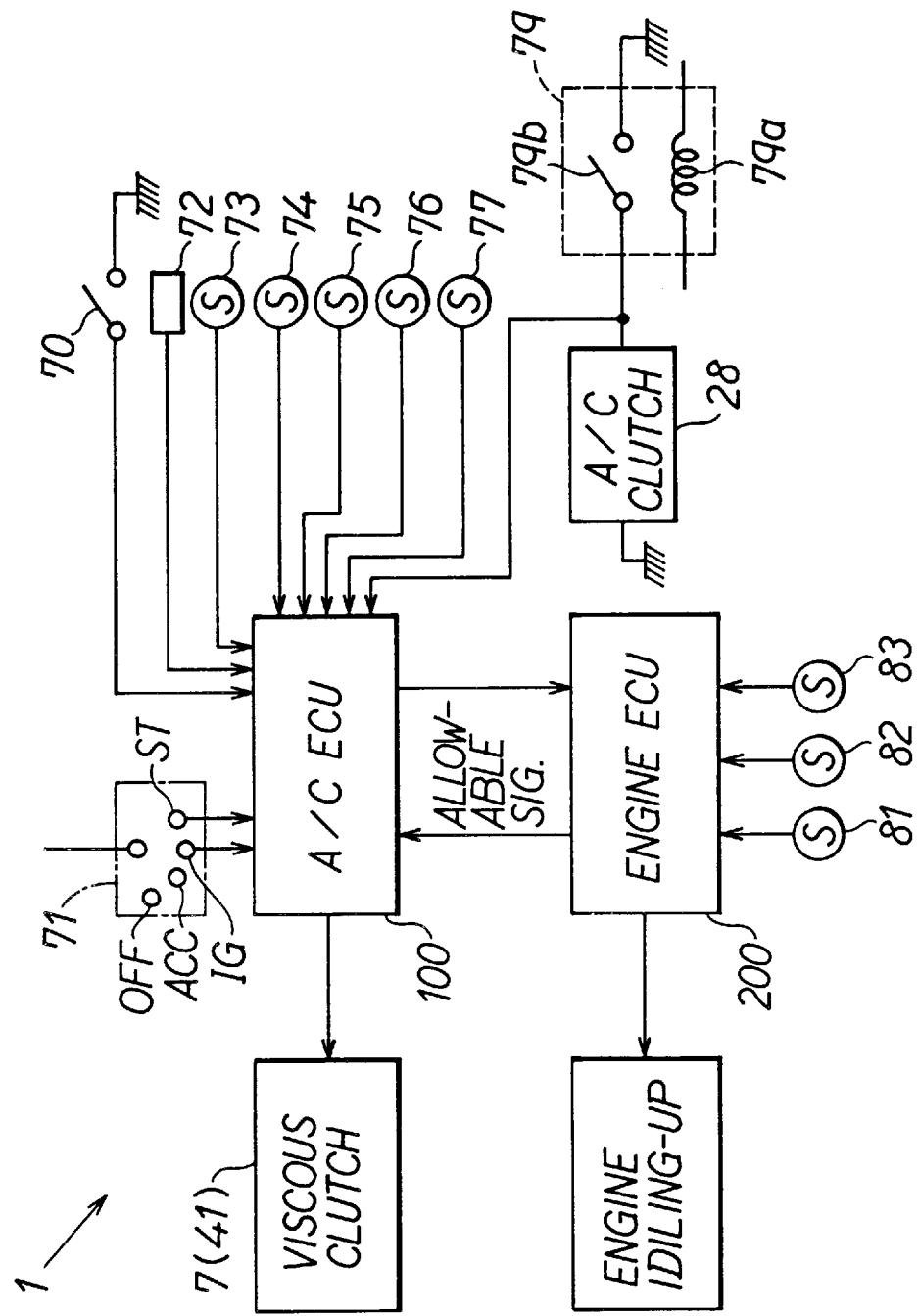
FIG. 5 is a block diagram showing an electric circuit of the air-conditioning apparatus for a vehicle in the first embodiment.

Next, an air-conditioning ECU 100 will be described briefly with reference to FIGS. 1, and 5–8. FIG. 5 shows an electric circuit of the system 1.

The air-conditioning ECU 100 is an electric circuit for performing a computer control for cooling and heating equipment of the compressor of the air-conditioning apparatus 2, the viscous heater 9, and the like. The air-conditioning ECU 100 is a microcomputer in which a CPU, a ROM, and a RAM are incorporated.

The air-conditioning ECU 100 performs an air-conditioning control for the passenger compartment by controlling an cooling and heating equipment including the electromagnetic coil 41 of the viscous clutch 7, the front blower 22, the inside air/outside air switching door 24, the mode switching door 25, an electromagnetic coil of the air-conditioning clutch 27, and the rear blower 32, and the like, based on input signals from a viscous switch 70, an ignition switch 71, a temperature setting unit 72, an inside air temperature sensor 73, an outside air temperature sensor 74, a sunlight sensor 75, a cooling water temperature sensor 76, an oil temperature sensor 77, an air-conditioning clutch relay 79 and the engine ECU 200, a pre-stored control program (see FIG. 6), and the like.

A viscous switch 70 is for preferring a heating operation for the passenger compartment by using the viscous heater 9. When the viscous switch 70 is set on, a heating preference signal is output to the air-conditioning ECU 100.

The viscous switch 70 is an economical fuel consumption preference switch for giving an improvement of the fuel consumption rate (fuel economy) priority. When the viscous switch 70 is set on, a fuel consumption preference signal is output to the air-conditioning ECU 100.

The ignition switch 71 includes each terminal of OFF, ACC, ST and IG. The terminal of OFF is a stator operating switch for outputting a signal to supply an electric current to a starter to the air-conditioning ECU 100.

The temperature setting unit 72 sets a temperature of the passenger compartment for a desired temperature and outputs a set temperature signal to the air-conditioning ECU 100.

The inside air temperature sensor 73 employs a thermistor, for example, to detect a temperature of air in the passenger compartment (inside air temperature), and outputs an inside air temperature detection signal to the air-conditioning ECU 100.

The outside air temperature sensor 74 employs a thermistor, for example, to detect a temperature of air outside the passenger compartment of the vehicle (outside air temperature), and outputs an outside air temperature detection signal to the air-conditioning ECU 100.

The sunlight sensor 75 employs, a photo-diode, for example, to detect an amount of sunlight entering the passenger compartment, and outputs a sunlight detection signal to the air-conditioning ECU 100. Further, as means for detecting environmental conditions, there may be additionally employed a post-evaporator sensor for detecting a temperature of air immediately after passing through the evaporator 26, or an outlet air temperature sensor disposed in either one of air outlets of the front duct 21, for detecting a temperature of air blown out into the passenger compartment.

The cooling water temperature sensor 76 employs a thermistor, for example, to detect a temperature of the cooling water in the cooling water circuit W (in this embodiment, a temperature of the cooling water in the outlet side cooling water pipe 57b of the cooling water passage 51 of the viscous heater 9). The cooling water temperature sensor 76 outputs a cooling water temperature detection signal to the air-conditioning ECU 100.

The oil temperature sensor 77 employs a thermistor, for example, to detect a temperature of the viscous fluid, i.e., oil temperature, in the heat-generating chamber 50, and outputs an oil temperature detection signal to the air-conditioning ECU 100.

The air-conditioning clutch relay 79 is composed of a relay coil 79a and a relay switch 79b. When an electric current is supplied to the relay coil 79a, the relay switch 79b is closed. In this way, an electric current is supplied to the air-conditioning clutch 27.

Figure 6:
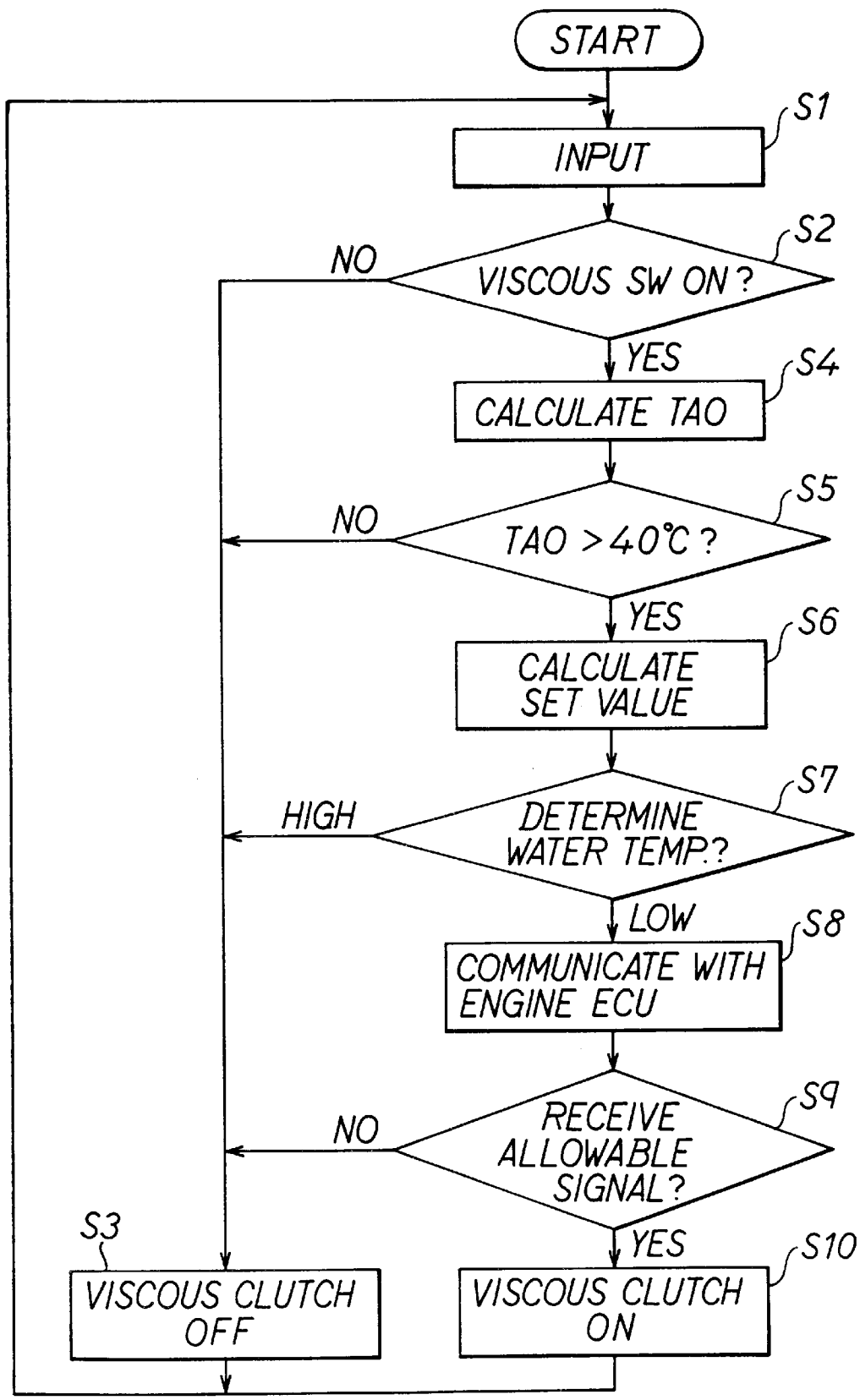
FIG. 6 is a flow chart of a control program of an air-conditioning ECU.

Next, a control of the viscous heater 9 of the air-conditioning ECU 100 will be described with reference to FIGS. 1–8. FIG. 6 shows a flow chart of a control program of the air-conditioning ECU 100.

Firstly, various kinds of sensor signals and switch signals are input at step S1.

Next, it is determined whether or not the viscous switch 70 is set on, i.e., whether or not the heating preference signal or the economical fuel consumption preference switch is input at step S2. When the determination is "NO", it is not necessary to heat the passenger compartment and a priority is given on the improvement of the fuel consumption rate of the engine E. Therefore, the electromagnetic coil 41 of viscous clutch 7 is turned off, i.e., the supply of the electric current to the electromagnetic coil 41 is stopped, and the rotor 53 of the viscous heater 9 is stopped rotating at step S3. Next, it proceeds to the process at step S1.

When the determination at Step S2 is "YES", a target air temperature TAO of the air blown into the passenger compartment is calculated based on the following formula (1) at Step S4.

$$TAO = Kset \times Tset - Kr \times Tr - Kam \times Tam - Ks \times Ts + C \tag{1}$$

wherein, Kset is a temperature setting gain, Tset is a set temperature set by the temperature setting unit 72, Tr is an inside air temperature, detected by the inside air temperature sensor 73, Kam is an outside air gain, Tam is an outside air temperature, detected by the outside air temperature 74, Ks is a sunlight gain, Ts is an amount of sunlight, detected by the sunlight sensor 75, and C is a correction constant.

Next, it is determined whether or not the target air temperature TAO is higher than a predetermined temperature (for example, 40° C.) at Step S5. When the determination is "NO", it proceeds to the process at Step S3, and the electromagnetic coil 41 of the viscous clutch 7 is set off.

On the other hand, when the determination is "YES", a set cooling water temperature (set value) for determining a timing when the electromagnetic coil 41 of the viscous clutch 7 is set on or off is determined according to characteristics graph (see FIG.7) of set cooling water temperature determination control based on the target air temperature TAO pre-stored in a memory circuit (for example, ROM) at Step S6.

Figure 7:
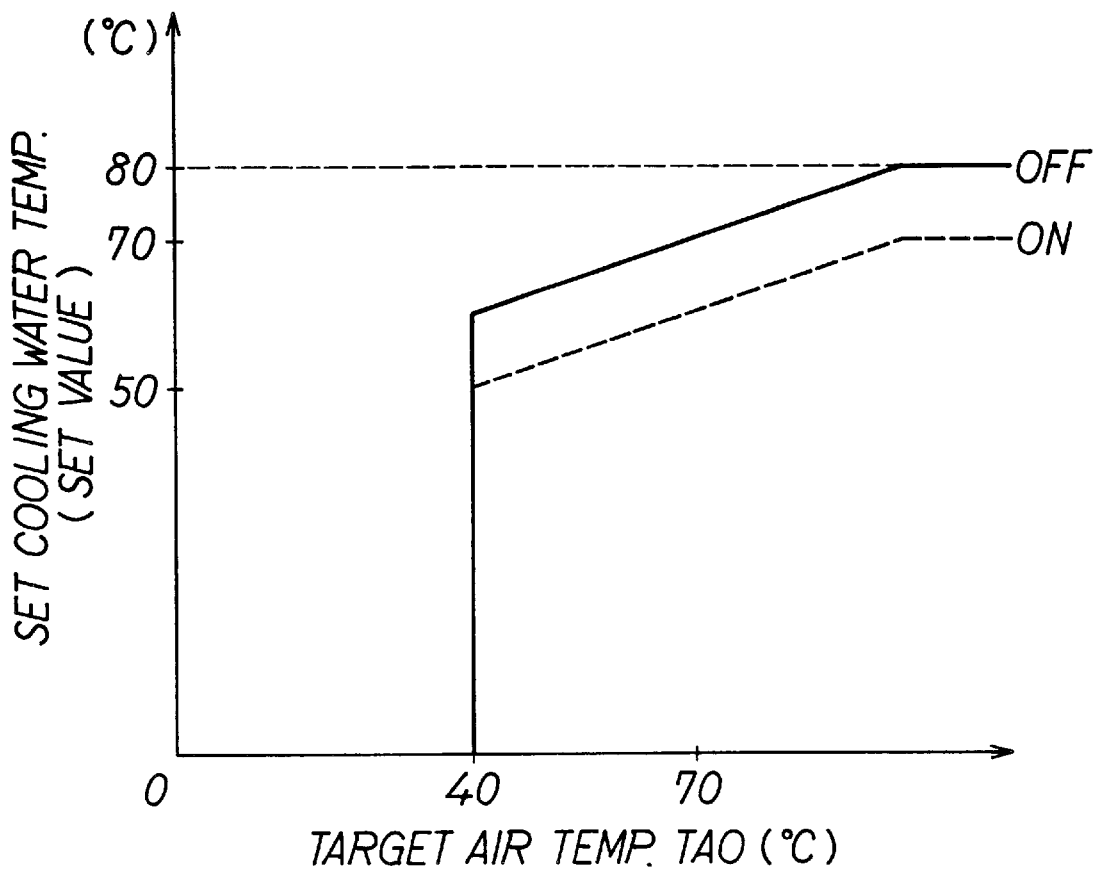
FIG. 7 is a graph for a control process of the air-conditioning ECU, showing a relationship between a target air temperature and a set cooling water temperature in the first embodiment.

More specifically, as shown in the characteristics graph of FIG. 7, the set cooling water temperature (the set value for turning on or off the viscous clutch 7) is shifted toward the high-temperature side in accordance with an increase of the temperature of the target air temperature TAO. In FIG. 7, a hysteresis is given to the characteristics graph of FIG. 7; however, the hysteresis may not be given.

Next, it is determined whether the electromagnetic coil 41 of the viscous clutch 7 is set on or off is determined according to characteristics graph (see FIG. 8) of the viscous heater control based on the cooling water temperature, prestored in a memory circuit (for example, ROM). That is, it is determined whether or not the cooling water temperature detected by the cooling water temperature sensor 76 is equal to or higher than the set cooling water temperature (the set value) at step S7.

Figure 8:
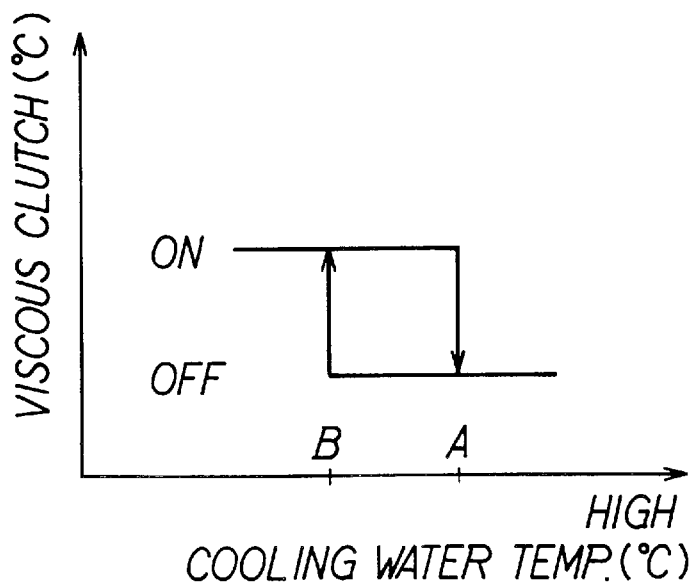
FIG. 8 is a graph for a control process of the air-conditioning ECU, showing a relationship between a cooling water temperature and an operation state of a viscous clutch in the first embodiment.

More specifically, as shown in the characteristics graph of FIG. 8, a hysteresis is given between the first set cooling water temperature A (for example, 80° C.) and the second set cooling water temperature B (for example, 70° C.). When the cooling water temperature is equal to or higher than the set cooling water temperature, the electromagnetic coil 41 is set off, whereas when the cooling water temperature is equal to or lower than the set cooling water temperature, the electromagnetic coil 41 is set on. The hysteresis is given to the characteristics graph of FIG. 8; however, the hysteresis may not be given.

When the cooling water temperature is equal to or higher than the set cooling water temperature at step S7, it proceeds to the step S3, and the electromagnetic coil 41 of the viscous clutch 7 is set off.

Further, when the cooling water temperature is equal or lower than the set cooling water temperature, it performs a communication with (transmits a signal to and receives a signal from) the engine ECU 200 at Step S8.

Next, it is determined whether an allowable signal for allowing the electromagnetic coil 41 of the viscous clutch 7 to be turned on is received from the engine ECU 200 at Step S9. When the determination is "NO", it proceeds to the process at Step S3, and the electromagnetic coil 41 of the viscous clutch 7 is turned off.

When the determination is "YES" at Step S9, to compensate an insufficient heating capacity in the maximum heating operation, the electromagnetic coil 41 of the viscous clutch 7 is turned on. That is, an electric current is supplied to the electromagnetic coil 41 of the viscous clutch 7 so that the viscous heater 9 operates at Step S10. Next, it proceeds to the process at Step S1.

Next, the engine ECU 200 will be briefly described with reference to FIGS. 1–5.

The engine ECU 200 for an engine control system is an electric circuit for performing a computer control of the engine E. The engine ECU 200 is a microcomputer in which a CPU, a ROM, and a RAM are incorporated.

The engine ECU 200 controls an idling rotational speed of the engine E, a fuel injection amount, a fuel injection timing, an intake air throttle, a supply of electric current to a glow plug, and the like, based on signals input from an engine rotational speed sensor 81, a vehicle speed sensor 82, the throttle opening sensor 83, and an air-conditioning ECU 100 and the pre-stored control program. The engine ECU 200 also transmits signals required for processes of the air-conditioning ECU 100 thereto.

The engine rotational speed sensor 81 detects a rotational speed of the output shaft 11 of the engine E and outputs an engine rotational speed signal to the engine ECU 200.

The vehicle speed sensor 82 employs, for example, a reed switch type vehicle speed sensor, a photo-electric switch type speed sensor, or a MRE (Magnetic Resistance Element) type vehicle sensor to detect a speed of the vehicle, and outputs a vehicle speed signal to the ECU 200.

The throttle opening sensor 83 detects an opening degree of the throttle valve disposed in an intake pipe of the engine E and outputs a throttle opening signal to the engine ECU 200.

Next, a viscous heater control of the engine ECU 200 will be briefly described with reference to FIGS. 1–5.

The engine ECU 200 determines whether an allowable signal for allowing the electromagnetic clutch 41 of the viscous clutch 7 to be turned on or an unallowable signal for allowing the electromagnetic clutch 41 of the viscous clutch 7 not to be turned on is transmitted to the air-conditioning ECU 100. When it is determined that the allowable signal is transmitted, an amount of intake air is increased so that an idling rotational speed is increased stepwise, i.e., a so-called idling-up control is performed.

Next, an operation of the system 1 according to the first embodiment will be briefly described with reference to FIGS. 1–8.

When the ignition switch 71 is connected to a terminal for supplying an electric current to the starter 60, i.e., the electric current is supplied to the starter 60, the pinion gear 61 is engaged with the ring gear 62 to start the engine E. In this way, the cooling water circulating in the water jacket 13 of the engine E is heated.

Further, when the engine E starts, the output shaft 11 rotates, and the rotational force of the engine E is transmitted to the rotor 42 through the V-belt 6 of the belt transmitting mechanism 5; however, when the electric current is supplied to the starter 60, the electromagnetic coil 41 of the viscous clutch 7 is turned off. That is, since the electromagnetic coil 41 is turned off, the armature 43 is not attracted toward the friction surface of the rotor 42. Accordingly, the rotational force of the engine E is not transmitted to the inner hub 45 and the shaft 8.

In this way, since the shaft 8 and the rotor 53 do not rotate, a shearing force is not applied to the viscous fluid in the heat-generating chamber 50, and the viscous fluid does not generate heat. Therefore, even if the cooling water heated in the water jacket 13 of the engine E flows through the cooling water passage 51 of the viscous heater 9, the cooling water is supplied to the front heater core 15 without being heated. Therefore, the heating operation of the passenger compartment is started with a small heating capacity.

When the viscous switch 70 is set on, in a case where the cooling water temperature is lower than the set cooling water temperature (set value) and the allowable signal is received from the engine ECU 200, the electromagnetic coil 41 of the viscous clutch 7 is turned on. That is, since the electromagnetic coil 41 is turned on, the armature 43 is attracted to the friction surface of the rotor 42 with magnetomotive force of the electromagnetic coil 41 to transmit the rotational force of the engine E to the inner hub 45 and the shaft 8.

In this way, since the rotor 53 rotates integrally with the shaft 8, a shearing force is applied to the viscous fluid in the heat-generating chamber 50 to generate heat. Therefore, when the cooling water heated in the water jacket 13 of the engine E passes through the cooling water passage 51, the cooling water is heated while absorbing heat generated by the viscous fluid through the fin portion 52a. The cooling water heated by the viscous heater 9 is supplied to the front heater core 15 so that the heating operation of the passenger compartment is performed with a large heating capacity.

The heating capacity of the viscous heater 9 may be set freely in advance by a viscous coefficient of the viscous fluid sealed in the heat-generating chamber 50. That is, the larger viscous coefficient the viscous fluid has, the larger the applying shearing force by the rotation of the rotor 53 becomes. Therefore, the heat-generating capacity of the rotor is increased, and the load and the fuel consumption rate of the engine E rise. On the other hand, the smaller viscous coefficient the viscous fluid has, the smaller the applying shearing force by the rotation of the rotor 53 becomes. Therefore, the heat-generating capacity of the rotor is decreased, and the load and the fuel consumption rate of the engine E lower.

As described above, according to this embodiment, when the target air temperature TAO is high, in which sufficient heating capacity is necessary, the set cooling water temperature (set value) for determining the operating state of the viscous heater 9 (for example, the operating state where the viscous clutch 9 is set off) is increased. Therefore, the viscous heater 9 can be operated until the actual cooling water temperature becomes high. In this way, the cooling water heated in the viscous heater 9 can be supplied to the front heater core 15 or the rear heater core 16.

Thus, the temperature of the cooling water flowing into the front heater core 15 or the rear heater core 16 rises so that the temperature of the cooling water in the cooling water circuit W can be maintained at a predetermined temperature (for example, 80° C.). Therefore, a radiating amount of the front heater core 15 or the rear heater core 16 increases, and the air sufficiently heated when passing through the front heater core 15 or the rear heater core 16 is blown into the passenger compartment to prevent the heating capacity for the passenger compartment from being lowered.

Further, according to this embodiment, when the target air temperature TAO is low, in which heating capacity is not necessary, the set cooling water temperature (set value) for determining the operating state of the viscous heater 9 (for example, the operating state where the viscous clutch 9 is set on) is decreased. Therefore, the viscous heater 9 can be stopped when the actual cooling water temperature is low. In this way, it is not necessary to transmit the rotational force of the engine E through the belt transmitting mechanism 5 and the viscous clutch 7, and the load of the engine E as well as the load of the belt transmitting mechanism 5 can be reduced. Accordingly, since the fuel consumption rate of the engine E can be lowered, the cost for running the vehicle can be lowered. Further, it is possible to prevent a generation of abnormal noise due to the slipping of the V-belt 6.

Further, according to this embodiment, when the viscous switch 70 as the heating preference switch is not set on, in a case where the cooling operation is necessary, e.g., the target air temperature TAO is equal to or lower than a predetermined value (for example, 40° C.), the large heating capacity is not necessary. Therefore, the electromagnetic coil 41 of the viscous clutch 7 is turned off so that the load of the engine E can be lowered.

In the system 1 according to this embodiment, while the air-conditioning ECU 100 does not receive the allowable signal from the engine ECU 200, the electromagnetic coil 41 of the viscous clutch 7 is set off. Therefore, it is possible to reduce the load of the engine E and to improve the running performance and the driveability of the vehicle.

A second embodiment of the present invention will be described with reference to FIG. 9.

Figure 9:
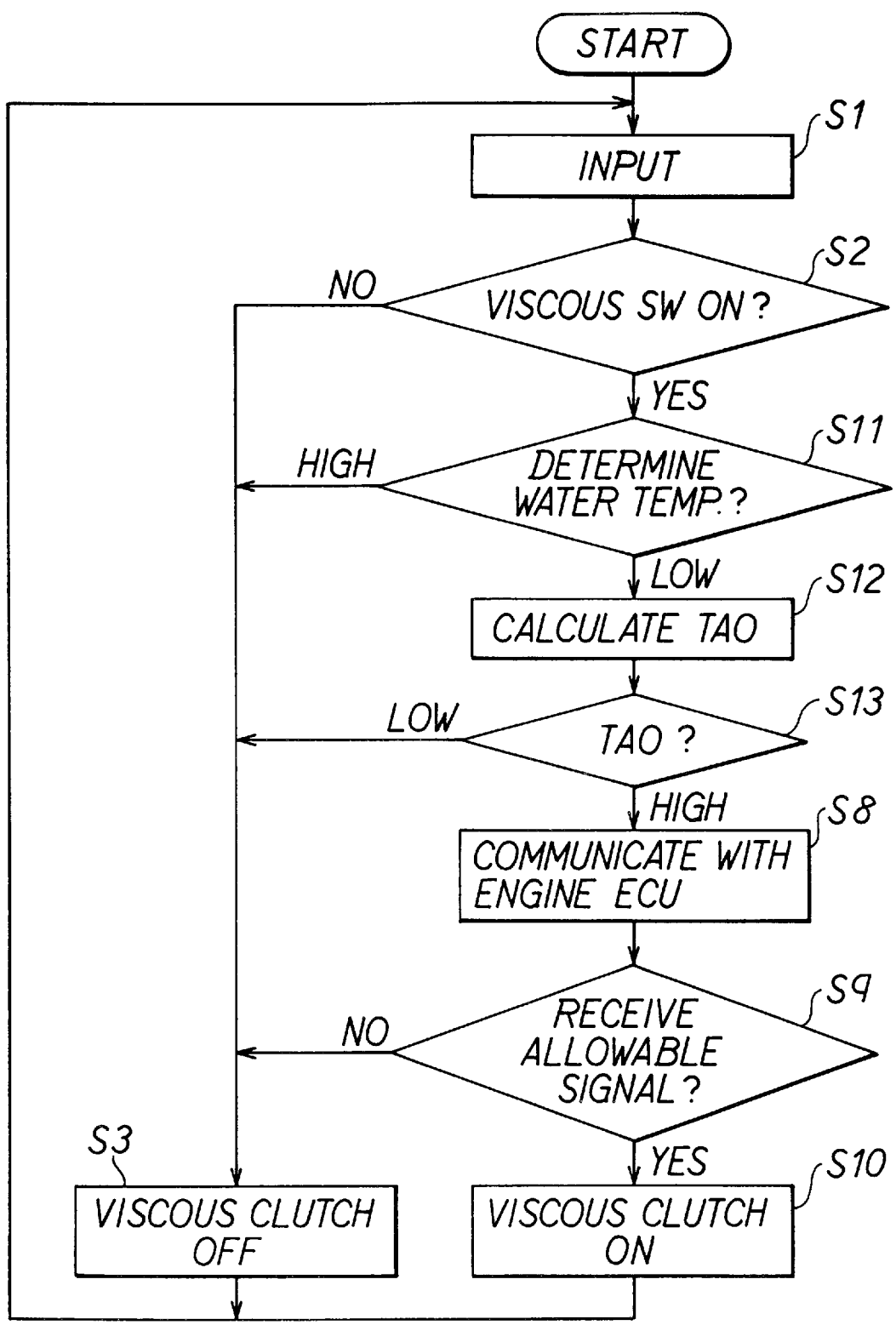
FIG. 9 is a flow chart of a control program of an air-conditioning ECU according to a second embodiment of the present invention.

FIG. 9 shows a flow chart of the control program of the engine ECU 200 according to the second embodiment. In FIG.9, The steps identical to those in the first embodiment are shown with the same numerals, and the explanation thereof is omitted.

In the second embodiment, when the determination at Step S2 is "YES", it is determined whether the cooling water temperature detected by the cooling water temperature sensor 76 is higher or lower than the predetermined cooling water temperature (for example, 70°–80° C.) at Step S11. When the cooling water temperature is higher than the predetermined temperature, a priority is given on the improvement of the fuel consumption rate of the engine E, it proceeds to the process of Step S3, and the electromagnetic coil 41 of the viscous clutch 7 is turned off.

When it is determined the cooling water temperature is lower than the predetermined temperature at Step S11, the target air temperature TAO is calculated based on the formula (1) in the first embodiment at Step S12.

Next, it is determined whether the target air temperature TAO calculated at Step S12 is higher or lower than a predetermined temperature (for example, 40° C.) at Step S13. When it is determined that the target air temperature TAO calculated at Step S12 is lower than the predetermined temperature, a priority is given on the improvement of the fuel consumption rate of the engine E, it proceeds to the process of Step S3, and the electromagnetic coil 41 of the viscous clutch 7 is turned off.

When it is determined that the target air temperature TAO calculated at Step S12 is higher than the predetermined temperature, a priority is given on the heating operation for the passenger compartment using the viscous heater 9, it proceeds to the processes at Steps S8–S10, and the electromagnetic coil 41 of the viscous clutch 7 is turned on according to these processes.

According to the above-described operation, the effects similar to those in the first embodiment can be obtained.

A third embodiment of the present invention will be described.

The entire construction in the third embodiment is identical to that in the first embodiment shown in FIGS. 1–5.

Figure 10:
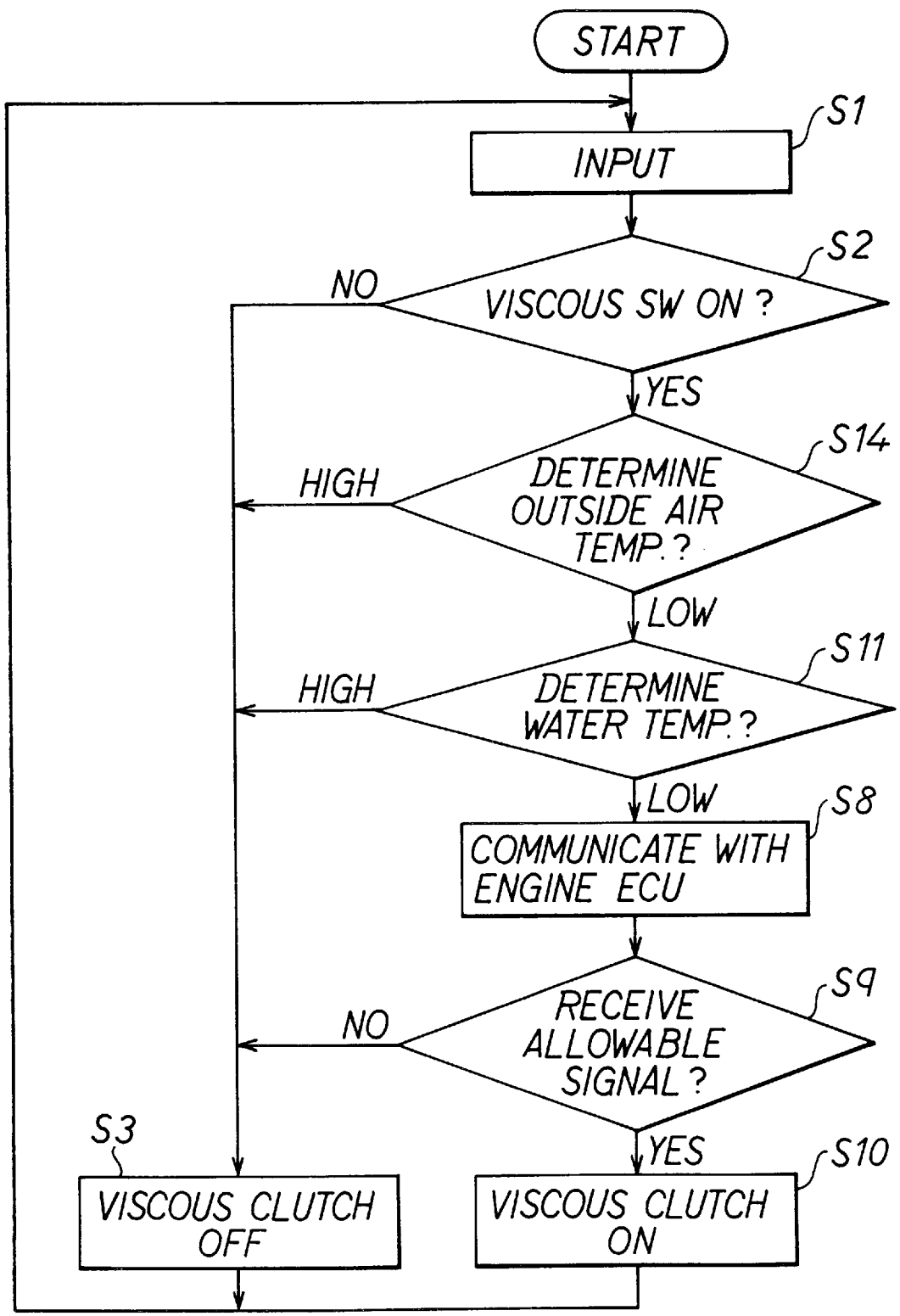
FIG. 10 is a flow chart of a control program of an air-conditioning ECU according to a third embodiment of the present invention.

Further, FIG. 10 shows a flow chart of the control program of the air-conditioning ECU 100 according to the third embodiment. In FIG. 10, the steps identical to those in the first embodiment are shown with the same numerals, and the explanation thereof is omitted.

When the determination at step S2 is "YES", whether the electromagnetic coil 41 of the viscous clutch 7 is set on or off is determined according to characteristics graph (see FIG. 11) of the viscous heater control based on the outside air temperature, pre-stored in a memory circuit (for example, ROM). That is, it is determined whether or not the outside air temperature detected by the outside air temperature sensor 74 is equal to or higher than the set outside air temperature (the set value) at step S14.

Figure 11:
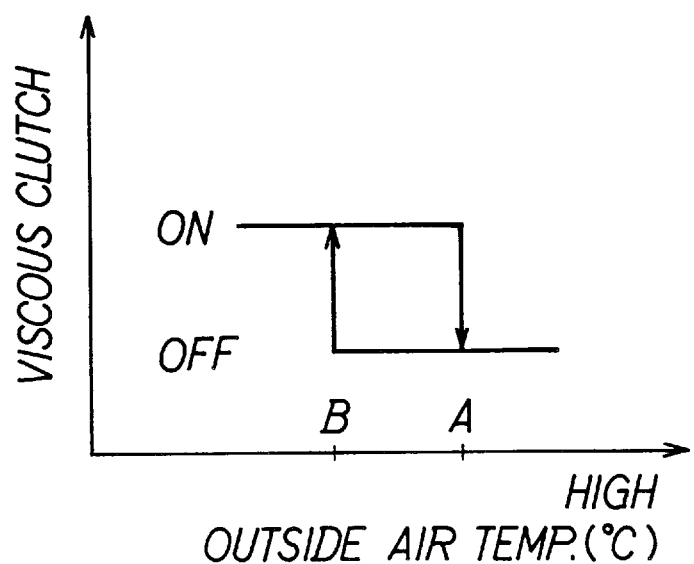
FIG. 11 is a graph for a control process of the air-conditioning ECU, showing a relationship between an outside air temperature and an operation state of a viscous clutch in the third embodiment.

More specifically, as shown in the characteristics graph of FIG. 11, a hysteresis is given between the first set outside air temperature A (for example, 25° C.) and the second set outside air temperature B (for example, 15° C.). When the outside air temperature is equal to or higher than the set outside air temperature, the electromagnetic coil 41 is set off, whereas when the outside air temperature is equal to or lower than the set outside air temperature, the electromagnetic coil 41 is set on. The hysteresis is given to the characteristics graph of FIG. 11; however, the hysteresis may not be given.

When the outside air temperature is equal to or higher than the set outside air temperature at step S14, it proceeds to the process at the step S3, and the electromagnetic coil 41 of the viscous clutch 7 is turned off.

When the outside air temperature is equal to or lower than the set outside air temperature at step S14, it is determined whether the electromagnetic coil 41 of the viscous clutch 7 is set on or off according to characteristics graph (see FIG. 12) of the viscous heater control based on the cooling water temperature, pre-stored in a memory circuit (for example, ROM). That is, it is determined whether or not the cooling water temperature detected by the cooling water temperature sensor 76 is equal to or higher than the set cooling water temperature (the set value) at step S5.

Figure 12:
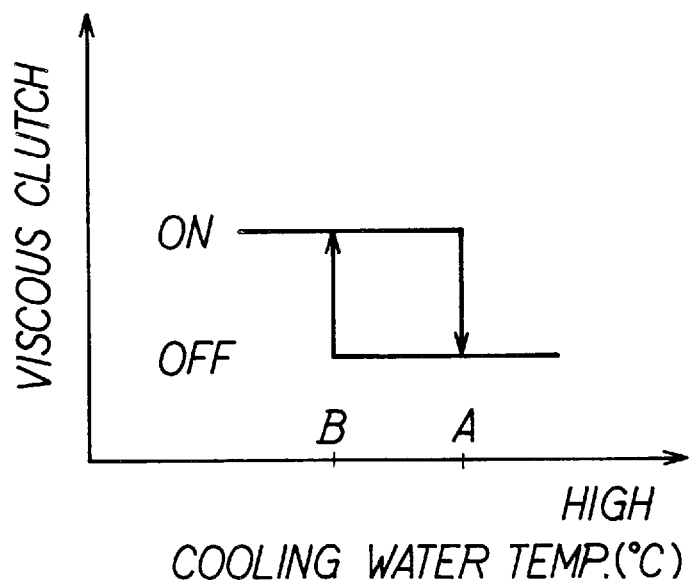
FIG. 12 is a graph for a control process of the air-conditioning ECU, showing a relationship between a cooling water temperature and an operation state of a viscous clutch in the third embodiment.

More specifically, as shown in the characteristics graph of FIG. 12, a hysteresis is given between the first set cooling water temperature A (for example, 80° C.) and the second set cooling water temperature B (for example, 70° C.). When the cooling water is equal to or higher than the set cooling water temperature, the electromagnetic coil 41 is set off, whereas when the cooling water temperature is equal to or lower than the set cooling water temperature, the electromagnetic coil 41 is set on. The hysteresis is given to the characteristics graph of FIG. 12; however, the hysteresis may not be given.

An operation of the system 1 according to the third embodiment will be described briefly with reference to FIGS. 1–5 and 10–12.

When the engine E starts, the output shaft 11 rotates, and the rotational driving force of the engine E is transmitted to the rotor 42 through the V-belt 6 of the belt transmitting mechanism 5. When the viscous switch 70 is set on, in a case where the outside air temperature is lower than the set outside temperature, the cooling water temperature is lower than the set cooling water temperature, and the allowable signal is received from the engine ECU 200, the electromagnetic coil 41 of the viscous clutch 7 is turned on. That is, since the electromagnetic coil 41 is turned on, the armature 43 is attracted to the friction surface of the rotor 42 by the magnetomotive force of the electromagnetic coil 41, and the rotational driving force of the engine E is transmitted to the inner hub 45 and the shaft 8.

In this way, since the rotor 53 rotates integrally with the shaft 8, a shearing force is applied to the viscous fluid in the heat-generating chamber 50 to generate heat. Therefore, when the cooling water heated in the water jacket 13 of the engine E passes through the cooling water passage 51, the cooling water is heated while absorbing heat generated by the viscous fluid through the fin portion 52a integrally formed with the separator 52. The cooling water heated by the viscous heater 9 is supplied to the front heater core 15 so that the heating operation of the passenger compartment is performed with a large heating capacity.

Here, when the engine E starts, the output shaft 11 rotates, and the rotational driving force of the engine E is transmitted to the rotor 42 through the V-belt 6 of the belt transmitting mechanism 5; however, even if the other used condition is satisfied, when the outside air temperature is higher than the set outside air temperature, it is not necessary to heat the passenger compartment but necessary to cool the passenger compartment, and therefore, the electromagnetic coil 41 of the viscous clutch 7 is turned off. Accordingly, the armature 43 is not attracted to the friction surface of the rotor 42, and the rotational driving force of the engine E is not transmitted to the inner hub 45 and the shaft 8. In this way, the rotor 42 simply races, and the shaft 8 and the rotor 53 do not rotate, thereby applying no shearing force to the viscous fluid in the heat-generating chamber 50.

As described above, in the third embodiment, even if the viscous switch 70 is set on, when the outside air temperature detected by the outside air temperature sensor 74 is higher than the set outside air temperature, the electromagnetic coil 41 of the viscous clutch 7 is turned off so that the armature 43 is separated from the friction surface of the rotor 42 of the viscous clutch 7. In this way, a large driving torque is not applied to the V-belt 6 and the rotor 42 which transmits the rotational driving force of the engine E to the shaft 8 of the viscous heater 9 and the rotor 53.

Therefore, when the viscous switch 70 as the heating preference switch is not set on, or when the outside air temperature is high, in which the cooling operation for the passenger compartment is necessary, the large hating capacity is not necessary. Therefore, the electromagnetic coil 41 of the viscous clutch 7 is turned off so that the load of the engine E can be reduced. Further, since the electromagnetic coil 41 of the viscous clutch 7 is turned off, it is possible to prevent a generation of abnormal noise due to the slipping of the V-belt 6 of the belt transmitting mechanism 5 and the slipping between the rotor 42 of the viscous clutch 7 and the armature 43. Further, when the engine E is started in summer season, the load of the engine E is reduced so that the starting performance of the engine E can be improved.

Figure 13:
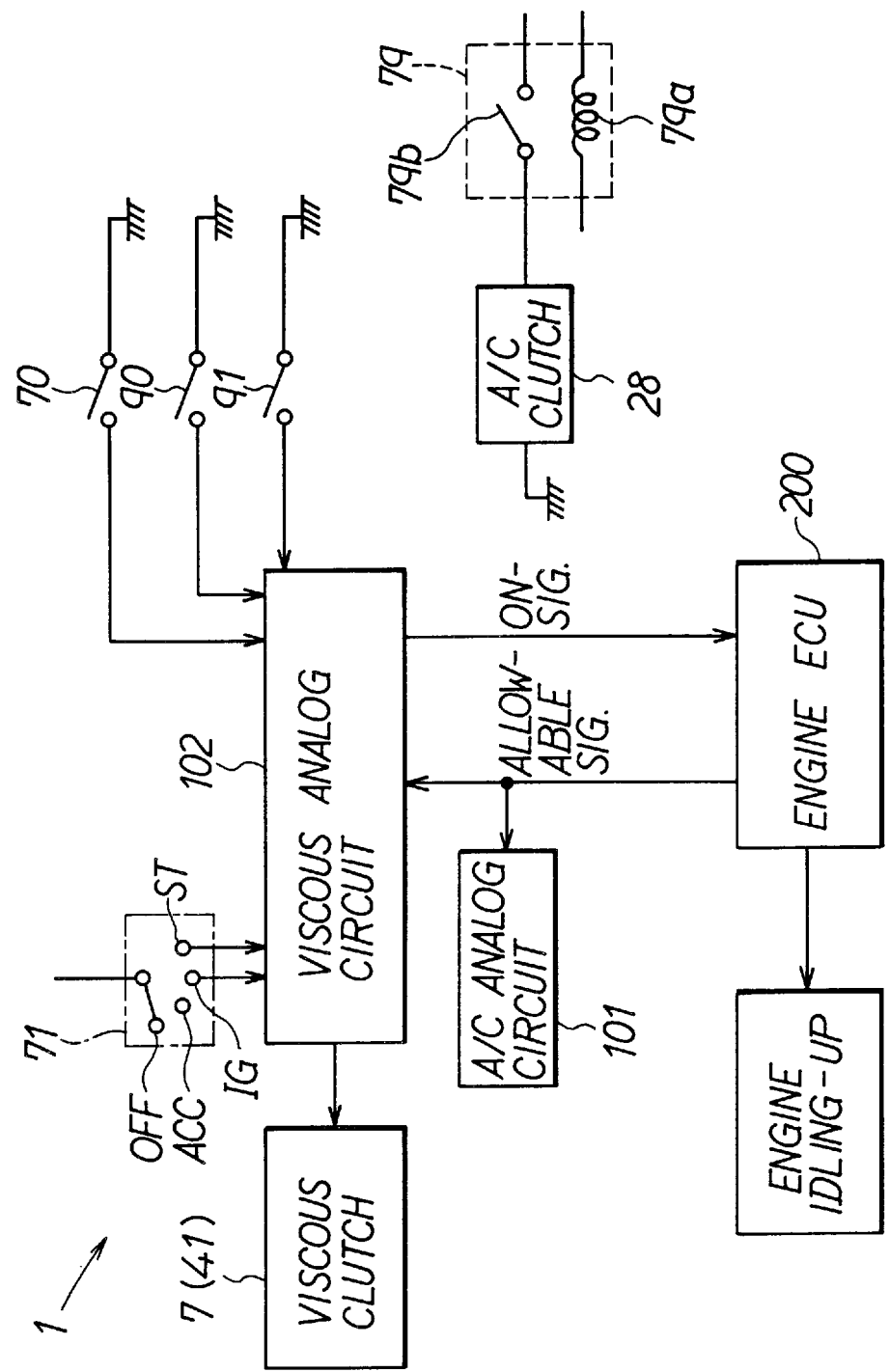
FIG. 13 is a block diagram showing an electric circuit of the air-conditioning apparatus for a vehicle according to a fourth embodiment of the present invention.

A fourth embodiment of the present invention will be described with reference to FIG. 13. FIG. 13 shows an electric circuit for an air-conditioning apparatus for a vehicle.

In the fourth embodiment, as shown in FIG. 13, instead of the air-conditioning ECU 100, there are provided an air-conditioning analog circuit 101 for performing an analog control on the air-conditioning unit 2 and a viscous analog circuit 102 for performing an analog control on the viscous clutch 7.

To an input portion of the viscous analog circuit 102, there are connected a ST terminal and an IG terminal of the ignition switch 71, a viscous switch 70, an outside air temperature switch 90, a cooling water temperature switch 91, and the engine ECU 200. To an output portion of the viscous analog circuit 102, there are connected the engine ECU 200 and the electromagnetic coil 41 of the viscous clutch 7.

The outside air temperature switch 90 is opened when the outside air temperature is higher than a first set outside air temperature A (for example, 25° C.) and is closed when the outside air temperature is lower than the first set outside air temperature A or a second set outside air temperature B (for example, 15° C.).

The cooling water temperature switch 91 is opened when the cooling water temperature in the cooling water circuit W (in this embodiment, a temperature of the cooling water in the outlet side cooling water pipe 57b of the cooling water passage 51 of the viscous heater 9) is higher than a first set cooling water temperature A (for example, 80° C.) and is closed when the cooling water temperature is lower than the first set cooling water temperature A or a second set outside air temperature B (for example, 70°–75° C.).

Further, when receiving an ON signal transmitted in a case where the viscous analog circuit 102 determines that the viscous clutch 7 is set on, the engine ECU 200 performs a calculation or determination based on the rotational speed of the engine E, the vehicle speed, the throttle opening, or the cooling water temperature and outputs to the viscous analog circuit 102 an allowable signal or unallowable signal for allowing the air-conditioning unit 2 or the viscous heater 9 to be or not to be turned on.

In this embodiment, even if the viscous switch 70 is set on, the cooling water temperature switch 91 is set on (closed), and further the allowable signal is received from the engine ECU 200, at a time when the outside air temperature switch 90 is turned off, the electromagnetic coil 41 of the viscous clutch 7 is turned off (opened) by the viscous analog circuit 102. In this way, the effects similar to those in the third embodiment can be obtained.

Figure 14:
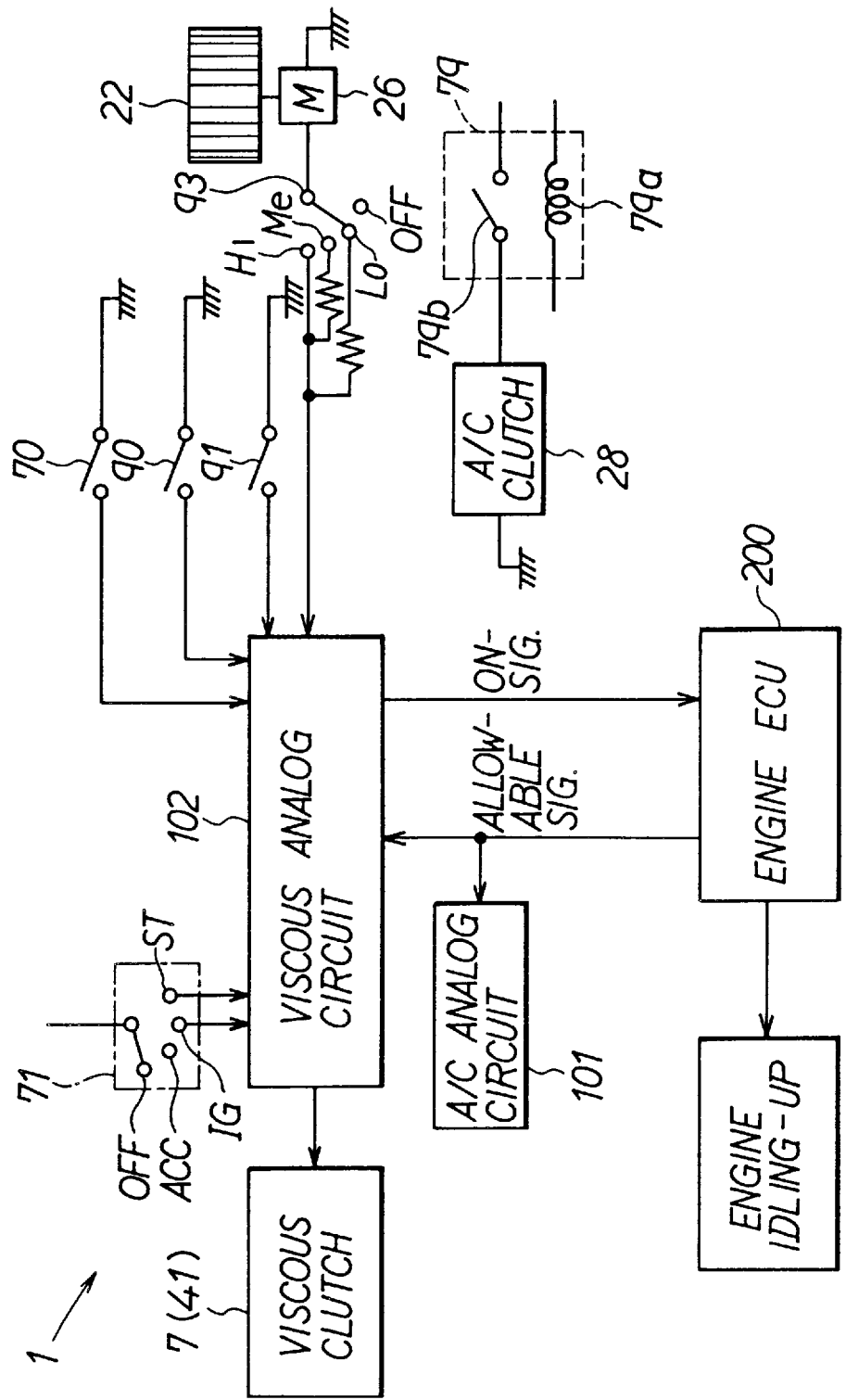
FIG. 14 is a block diagram showing an electric circuit of the air-conditioning apparatus for a vehicle according to a fifth embodiment of the present invention.

A fifth embodiment of the present invention will be described with reference to FIG. 14. FIG. 14 shows an electric circuit for an air-conditioning apparatus for a vehicle.

In this embodiment, a manual air-conditioning unit is employed as an air-conditioning unit for a vehicle. Further, to an input portion of the viscous analog circuit 102, in addition to the electric equipment in the fourth embodiment, there is connected a blower switch 93 for switching a blower voltage applied to the blower motor 23 of the front blower 22 by a manual operation.

The blower switch 93 includes a Hi-terminal for obtaining a large amount of air, a Me-terminal for obtaining a medium amount of air, a Lo-terminal for obtaining a small amount of air, and OFF-terminal for stopping a supply of an electric current to the blower motor 23.

In this embodiment, when the blower switch 93 is set off, the electromagnetic coil 41 of the viscous clutch 7 is turned off to stop the operation of the viscous heater 9, thereby reducing the load of the engine E. Even if the blower switch 93 is set off, at starting of the heating operation (warming-up operation), to facilitate a rise of the temperature of the cooling water having cooled the engine E, the electromagnetic coil 41 of the viscous clutch 7 is turned on to transmit the rotational driving force of the engine E to the rotor 53 of the viscous heater 9.

Here, in the fourth and fifth embodiments, instead of the outside air temperature switch 90, there may be employed the outside air temperature sensor 74 employed in the third embodiment. In this case, when the outside air temperature detected by the outside air temperature sensor 74 is higher than the set outside air temperature, the viscous analog circuit 102 turns on the electromagnetic coil 41 to transmit the rotational driving force of the engine E to the rotor 53 of the viscous heater 9. On the other hand, when the outside air temperature detected by the outside air temperature sensor 74 is lower than the set outside air temperature, the viscous analog circuit 102 turns off the electromagnetic coil 41 not to transmit the rotational driving force of the engine E to the rotor 53 of the viscous heater 9.

In each of the above-described embodiments, the shaft 8 of the viscous heater 9 is driven by connecting the belt transmitting mechanism 5 and the viscous clutch 7 to the output shaft 11 of the engine E; however, the viscous clutch 7 may be connected directly to the output shaft 11 of the engine E to drive the shaft 8 of the viscous heater 9. Further, between the output shaft 11 of the engine E and the viscous clutch 7 or between the viscous clutch 7 and the shaft 8 of the viscous heater 9, there may be connected a gear transmission having at least one stage gear or a V-belt type non-stage transmission.

The V-belt type non-stage transmission may be connected to the output shaft 11 of the engine E to drive the shaft 8 of the viscous heater 9, thereby eliminating the viscous clutch 7. In this case, a pulley ratio between an input pulley and an output pulley of the V-belt type non-stage transmission is optimized so that a load of the driving means such as the V-belt type non-stage transmission can be minimized while operating the viscous heater 9.

In each of the above-described embodiments, the V-belt 6 of the belt transmitting mechanism 5 are hung on both of the viscous clutch 7 and the air-conditioning clutch 27; however, the V-belt 6 of the belt transmitting mechanism 5 may be hung on an auxiliary equipment such as a hydraulic pump for power steering, a hydraulic pump for supplying operation oil to the automatic transmission, or a hydraulic pump for supplying lubricating oil to the engine E or the transmission with the viscous clutch 7. When the power steering is used at stopping of the vehicle, it is preferable that the viscous clutch 7 should be turned off.

In each of the above-described embodiments, a water-cooled diesel engine is employed as the engine E; however, the other water cooled engine such as a gasoline engine may be employed.

In each of the above-described embodiments, the present invention is applied to an air-conditioning apparatus for a vehicle, capable of performing a heating operation and a cooling operation for the passenger compartment; however, the present invention may be applied to an air-conditioning apparatus for a vehicle, capable of performing only a heating operation for the passenger compartment.

In each of the above-described embodiments, the cooling water temperature sensor 76 is employed as means for detecting an oil temperature of viscous fluid in the heat-generating chamber 50; however, the oil temperature sensor 77 may be employed. Further, there may be employed means for detecting a temperature of the housing 10 of the viscous heater 9. Still further, there may be employed means for detecting a temperature of air blown from a duct.

In each of the above-described embodiments, the cooling water temperature sensor 76 is employed to detect a temperature of the cooling water in the outlet side cooling water pipe 57*b* of the cooling water passage 51 of the viscous heater 9; however, there may be employed a cooling water temperature sensor or a cooling water temperature switch for detecting a temperature of the cooling water at an inlet side of the front heater core 15 or the rear heater core 16.

In each of the above-described embodiments, the electromagnetic coil 41 of the viscous clutch 7 is turned on or off by using the outside air temperature sensor 74 or the outside air temperature switch 90; however, the electromagnetic coil 41 of the viscous clutch 7 may be turned on or off by using the inside air temperature sensor 73 for detecting an inside air temperature in the passenger compartment at starting of the engine E or the air-conditioning operation. Further, instead of the outside air temperature sensor 74, the electromagnetic coil 41 of the viscous clutch 7 may be turned on or off by using means for detecting a temperature of a vehicle body. Still further, in a vehicle having a cooling operation switch, the electromagnetic coil 41 of the viscous clutch 7 may be turned off when a cooling operation is instructed by the cooling operation switch.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. A heating apparatus for heating a passenger compartment of a vehicle having a water-cooled engine, comprising:

a duct for blowing air into said passenger compartment;

means for forming a cooling water circuit through which cooling water for cooling said water-cooled engine circulates;

a heating heat exchanger disposed in said cooling water circuit and within said duct, for heating said passenger compartment by heat-exchanging cooling water having cooled said water-cooled engine with air;

a heat-generating unit using a shearing force, said heat-generating unit being disposed in said cooling water circuit and having a rotor which rotates when a rotational driving force is applied thereto and a heat-generating chamber for sealing therein viscous fluid which generates heat to heat said cooling water to be supplied to said heating heat exchanger when said shearing force generated by said rotational driving force of said rotor is applied to said viscous fluid;

viscous fluid temperature detecting means for detecting a temperature of said viscous fluid in said heat-generating chamber; and a heating control unit for controlling said heat-generating unit and maintaining said cooling water in said cooling water circuit at a predetermined temperature, said heating control unit operating said heat-generating unit when said temperature detected by said viscous fluid temperature detecting means is equal to a set value or less and stopping said heat-generating unit when said temperature detected by said viscous fluid temperature detecting means exceeds said set value; wherein, said heating control unit includes heating operation determination means for determining whether or not a condition requiring a heating operation for said passenger compartment is required, said heating control unit operates said heat-generating unit when said heating operation determination means determines that said heating operation for said passenger compartment is required, said heating control unit operates said heat-generating unit when said heating operation determination means determines that said condition is equal to a predetermined value or more, and said heating control unit stops said heat-generating unit when said heating operation determination means determines that said condition is lower than said predetermined value.

2. A heating apparatus according to claim 1, further comprising:

temperature setting means for setting a temperature of said passenger compartment for a desired value;

environmental condition detecting means for detecting an environmental condition having an influence on a heating state of said passenger compartment; and target air temperature calculating means for calculating a target temperature of air to be blown into said passenger compartment through said duct based on at least said set temperature set by said temperature setting means and said environmental condition detected by said environmental condition detecting means;

wherein said heating operation determination means is target air temperature determination means for determining that said condition is equal to said predetermined value or more when said target air temperature calculated by said target air temperature calculating means is equal to a predetermined temperature or more.

3. A heating apparatus according to claim 2, wherein said heating control unit increases said set value in accordance with an increase of said target air temperature when said target air temperature determination means determines that said target air temperature is higher than a predetermined temperature.

4. A heating apparatus according to claim 2, wherein said environmental condition detecting means includes inside air temperature detecting means for detecting a temperature of air in said passenger compartment.

5. A heating apparatus according to claim 4, wherein said environmental condition detecting means includes outside air temperature detecting means for detecting a temperature of air outside said passenger compartment.

6. A heating apparatus according to claim 1, further comprising:

outside air temperature detecting means for detecting a temperature of air outside said passenger compartment;

wherein said heating operation determination means determines that said condition is equal to said predetermined value or more when said outside air temperature is equal to a predetermined value or less.

7. A heating apparatus according to claim 1, wherein said viscous fluid temperature detecting means is cooling water temperature detecting means for detecting a temperature of said cooling water circulating in said cooling water circuit.

8. A heating apparatus according to claim 1, further comprising:

a driving force transmission unit for transmitting a driving force of said engine to said rotor.

9. A heating apparatus according to claim 8, wherein said driving force transmission unit includes:

a belt transmission connected to and driven by an output shaft of said engine, and a clutch connected to and driven by said belt transmission unit, for engaging and releasing said belt transmission unit and said rotor.

10. A heating apparatus for heating a passenger compartment of a vehicle having a water-cooled engine, comprising:

a duct for blowing air into said passenger compartment;

means for forming a cooling water circuit through which cooling water for cooling said water-cooled engine circulates;

a heating heat exchanger disposed in said cooling water circuit and within said duct for heating said passenger compartment by heat-exchanging cooling water having cooled said water-cooled engine with air;

a heat-generating unit using a shearing force, said heat-generating unit being disposed in said cooling water circuit and having a rotor which rotates when a rotational diving force is applied thereto and a heat-generating chamber for sealing therein viscous fluid which generates heat to heat said cooling water to be supplied to said heating heat exchanger when said shearing force generated by said rotational driving force of said rotor is applied to said viscous fluid;

viscous fluid temperature detecting means for detecting a temperature of said viscous fluid in said heat-generating chamber; and a heating control unit for controlling said heat-generating unit and maintaining said cooling water in said cooling water circuit at a predetermined temperature, said heating control unit operating said heat-generating unit when said temperature detected by said viscous fluid temperature detecting means is equal to a set value or less and stopping said heat-generating unit when said temperature detected by said viscous fluid temperature detecting means exceeds said set value;

wherein said heating control unit increases said set value in accordance with an increase of a condition requiring a heating operation for said passenger.

11. A heating apparatus according to claim 10, further comprising:

temperature setting means for setting a temperature of said passenger compartment for a desired value;

environmental condition detecting means for detecting an environmental condition having an influence on a heating state of said passenger compartment; and target air temperature calculating means for calculating said target temperature of air to be blown into said passenger compartment through said duct based on at least a set temperature set by said temperature setting means and an environmental condition detected by said environmental condition detecting means;

wherein said heating control unit increases said set value in accordance with an increase of said target air temperature calculated by said target air temperature calculating means.

* * * * *